L. O. COLVIN.
COW MILKING MACHINE.

No. 74,507. Patented Feb. 18, 1868.

Inventor
L O Colvin

Witnesses:

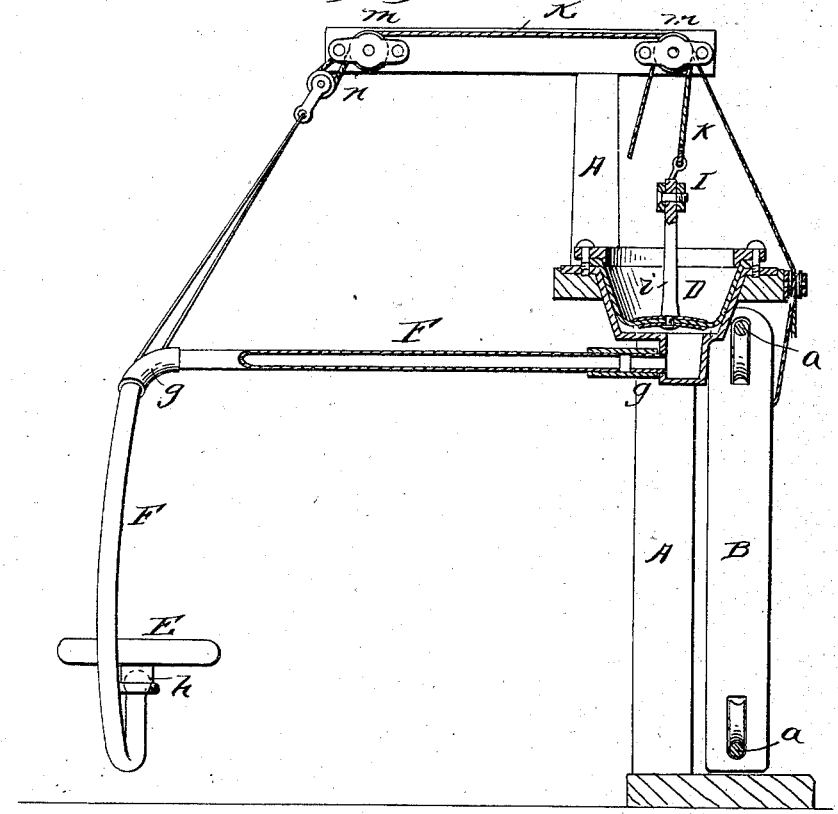

United States Patent Office.

L. O. COLVIN, OF NEW YORK, N. Y.

*Letters Patent No. 74,507, dated February 18, 1868.*

IMPROVEMENT IN COW-MILKING MACHINERY.

The Schedule referred to in these Letters Patent and making part of the same.

TO ALL WHOM IT MAY CONCERN:

Be it known that I, L. O. COLVIN, of the city, county, and State of New York, have invented certain new and useful Improvements in Cow-Milking Machinery; and I do hereby declare that the following is a full, clear, and exact description of the same, reference being had to the accompanying drawings, making a portion of this specification, in which—

Figure 2 is a vertical section of the same, taken in a line at right angles to fig. 1.

Similar letters of reference indicate corresponding parts in both figures.

Figure 1:
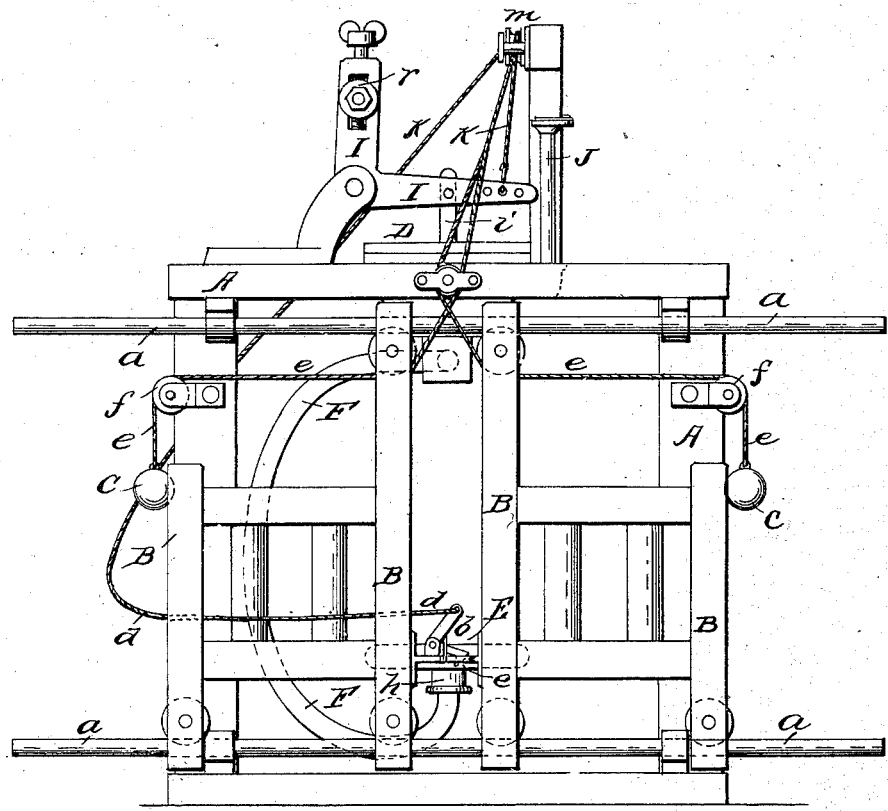
Figure 1 is an elevation of cow-milking mechanism constructed and operated according to my invention.

The object of this invention is to provide means whereby the operation of milking may be carried on with greater facility and quickness than has hitherto been found practicable.

The invention consists in giving the "milker," when in use, a vertical movement, in close imitation of the "bunting" of the calf, whereby its efficiency in withdrawing the milk from the udder is materially increased, and, furthermore, in a novel means whereby this movement of the milker may be produced.

The invention also consists in certain novel means of operating the milker, of securing the proper adjustment of the same when applied to use, of insuring the rapid passage or movement of the cows from the apparatus when the milking-operation is completed, and of preventing any derangement of the milking-devices from the vaporization of the liquid employed as a medium for the transmission of power to the milker in the operation of the same, the object mentioned being, by these means, very effectually secured.

To enable others to understand the construction and operation of my invention, I will proceed to describe it with reference to the drawings.

A represents an upright framework, furnished with horizontal guide-rods, $a$, on which work laterally-moving gates or stanchions, B, which are held at a comparatively short distance apart, to confine or hold between them the neck of the cow, by means of a latch, $b$, attached to one of the said gates, and catching into a loop or staple, $c$, secured upon the other. The latch $b$ has attached to it a cord, $d$, by pulling which the gates are disconnected, so as to be drawn apart, through the agency of weights C, attached to cords $e$, which, passing over pulleys $f$, have their opposite extremities attached to the gates Situated in any suitable position upon the framework A is a pump, D, preferably of the variety known as diaphragm-pumps. The said pump D is connected with the milker, indicated at E, by a tube, F, and acts upon the fluid with which the said tube is filled, to operate the milker, the construction of which, and the manner of working the same by the motion of the aforesaid fluid, are substantially the same as set forth in the patent of L. O. COLVIN, bearing date May 22, 1867.

The tube F is made preferably of metal, with one or more flexible joints, $g$, which may be formed of short pieces of rubber, or other like tubing, interposed between and attached to the metallic sections of the aforesaid tube, the object of the flexible joints just mentioned being to enable the milker to be conveniently handed and brought into proper relation with the udder of the cow in affixing the same thereto. The free extremity of the latter is, furthermore, provided with a universal joint, $h$, whereby it is connected with the milker, the latter being, by this means, enabled to be adjusted in any desired position upon the aforesaid extremity of the tube.

The rod $i$ of the pump is connected with one arm of a bent lever, I, from one extremity of which is extended a cord, $k$, the said cord passing over pulleys, $m\ m$, and, having its opposite end attached to a suitable support, is looped through a pulley, $n$, the sheave of which is connected with the tube F of the milker, so that, a vibrating movement being communicated to the bent lever by a pitman or other suitable means, connected with the upright arm thereof, a rising and falling movement, simultaneous with the operation of the pump D, will be communicated to the tube F, and, consequently, to the milker, the object of which will be herein presently fully set forth.

The extent of the motion communicated to the bent lever may be regulated by adjusting the pitman, or equivalent device, at a greater or less distance from the axis or pivot thereof, by means of a sliding or adjustable box, $r$, fitted into the upright arm of the said lever.

Shown at J is an upright tube, in the upper end of which is fitted a valve, opening outward, and constituting, as it were, a safety-valve, which permits the escape of vapors evolved from the fluid in the tube F and pump D, which, if not thus got rid of, might interfere with the proper working of the apparatus.

In using the apparatus, the gates are brought apart, as hereinbefore explained, far enough to permit the cow to be placed with her neck between them, and are then brought toward each other, and connected by the latch b, so as to confine the cow by the neck, and thus insure her retention in place, whereupon the milker is applied to the teats of the cow, in the manner set forth in the patent hereinbefore mentioned, which being done, the bent lever I is operated to work the pump, and thus operate the milker to pump or draw the milk from the udder, simultaneous with which the up-and-down movement of the milker, produced by the action of the cord k, as hereinbefore set forth, causes the milker to be forced upward at intervals, with increased pressure, against the udder, the said pressing movement closely resembling the "bunting" movement of the calf in sucking, and materially facilitating the action of the milker in drawing the milk from the udder. When the milking-operation has been continued for a suitable length of time, or, in other words, is completed, the milker is detached from the teats, and, the gates being again brought apart, the cow is permitted to pass between them away from the apparatus, thus allowing another to be immediately driven to her place to be milked in the same manner, so that, by these means, a number of cows may be rapidly milked in the same manner, in succession, by a single milker. Furthermore, when it is desired to operate several milkers simultaneously, the upright arms of their several bent levers, I, may be connected by suitable rods, in such manner that the movement of one will be communicated to the others, a single driving-pitman being thus sufficient to operate them all.

What I claim as my invention, and desire to secure by Letters Patent, is—

1. So operating the "milker" that the same may have a vertical or "bunting" movement, substantially as and for the purpose specified.

2. The pulley n and cord k, in combination with the tube F of the milker and the bent lever I, substantially as and for the purpose specified.

3. The bent lever I, in combination with the pump D, operating the milker, substantially as and for the purpose specified.

4. The gates or stanchions B, so constructed and operating as to secure the cow whilst being milked, and to admit of her passage between them when liberated, substantially as set forth.

5. An escape-valve, arranged in relation with the pump D and the tube F of the milker, substantially as and for the purpose specified.

6. The universal joint h, arranged in combination with the milker, and the tube F thereof, substantially as and for the purpose specified.

L. O. COLVIN.

Witnesses:
J. W. COOMBS,
A. LE CLERC.